United States Patent
Wada

(10) Patent No.: US 10,589,632 B2
(45) Date of Patent: Mar. 17, 2020

(54) VEHICLE AND METHOD FOR CHARGING THE SAME

(71) Applicant: Toyota Jidosha Kabushiki Kaisha, Toyota-shi Aichi-ken (JP)

(72) Inventor: Kotaro Wada, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 159 days.

(21) Appl. No.: 15/817,869

(22) Filed: Nov. 20, 2017

(65) Prior Publication Data

US 2018/0154792 A1  Jun. 7, 2018

(30) Foreign Application Priority Data

Dec. 6, 2016 (JP) .................................. 2016-236494

(51) Int. Cl.
*H02J 7/00* (2006.01)
*B60L 11/18* (2006.01)
*B60L 50/15* (2019.01)
*B60L 53/14* (2019.01)
*B60L 58/12* (2019.01)
*B60L 53/66* (2019.01)

(52) U.S. Cl.
CPC ........... *B60L 11/1848* (2013.01); *B60L 50/15* (2019.02); *B60L 53/14* (2019.02); *B60L 53/665* (2019.02); *B60L 58/12* (2019.02); *B60L 2240/547* (2013.01); *B60L 2240/62* (2013.01); *Y02T 10/7005* (2013.01); *Y02T 10/7088* (2013.01)

(58) Field of Classification Search
USPC ........................................................ 320/109
See application file for complete search history.

(56) References Cited

U.S. PATENT DOCUMENTS

| 9,545,853 | B1 * | 1/2017 | Penilla | G06Q 10/20 |
| 2010/0164438 | A1 * | 7/2010 | Saito | H02J 7/14 |
| | | | | 320/152 |
| 2012/0123670 | A1 * | 5/2012 | Uyeki | H02J 7/0027 |
| | | | | 701/300 |

(Continued)

FOREIGN PATENT DOCUMENTS

| JP | 2000166114 A | 6/2000 |
| JP | 2004159414 A | 6/2004 |

(Continued)

*Primary Examiner* — Samuel Berhanu
(74) *Attorney, Agent, or Firm* — Dinsmore & Shohl LLP

(57) ABSTRACT

A vehicle includes an inlet configured to be able to receive electric power to charge a power storage device from a charging apparatus or a charging station. An ECU is configured to perform second charging control for causing a power converter to reduce charging current into the power storage device when a voltage of the power storage device is higher than a predetermined voltage, as compared with when a voltage thereof is lower than the predetermined voltage. The ECU reduces charging time by second charging control when the power storage device is charged with electric power supplied from an external charging apparatus and the external charging apparatus is a charging station billing electricity bills in accordance with charging time, as compared with when the external charging apparatus is a charging apparatus installed at a user's home.

5 Claims, 10 Drawing Sheets

(56) References Cited

U.S. PATENT DOCUMENTS

| | | | | |
|---|---|---|---|---|
| 2012/0161702 A1* | 6/2012 | Kim | ............... | B60L 58/13 |
| | | | | 320/109 |
| 2013/0314037 A1* | 11/2013 | Caffy | ............... | H02J 7/0027 |
| | | | | 320/109 |
| 2013/0338824 A1* | 12/2013 | Becker | ............... | H02J 7/0027 |
| | | | | 700/237 |
| 2015/0321570 A1* | 11/2015 | Cun | ............... | G06Q 50/06 |
| | | | | 705/34 |
| 2015/0354974 A1* | 12/2015 | Takehara | ............... | B60L 53/60 |
| | | | | 701/423 |
| 2015/0357837 A1* | 12/2015 | Takai | ............... | H01M 10/44 |
| | | | | 320/107 |

FOREIGN PATENT DOCUMENTS

| | | |
|---|---|---|
| JP | 2008067496 A | 3/2008 |
| JP | 2016-181987 A | 10/2016 |

* cited by examiner

EXTERNAL CHARGING AT USER' HOME

EXTERNAL CHARGING AT CHARGING STATION

VEHICLE AND METHOD FOR CHARGING THE SAME

CROSS-REFERENCE TO RELATED APPLICATIONS

This application claims priority to Japanese Patent Application No. 2016-236494 filed on Dec. 6, 2016, which is incorporated herein by reference in its entirety.

BACKGROUND

1. Technical Field

The present disclosure relates to a vehicle and a method for charging the vehicle. More specifically, it relates to a technique to charge a power storage device mounted in the vehicle with electric power supplied from a charging apparatus installed outside the vehicle.

2. Description of Related Art

In recent years, a plug-in hybrid vehicle and an electric vehicle have received attention as a vehicle configured to be capable of "external charging" by which a power storage device mounted in a vehicle is charged with electric power supplied from a charging apparatus installed outside the vehicle. Japanese Patent Application Publication No. 2016-181987 provides external charging control for varying charging current for a power storage device in accordance with voltage of the power storage device in this kind of vehicle.

SUMMARY

In a vehicle in which a power storage device is mounted, an upper limit voltage is set for the power storage device to protect the power storage device. When a voltage of the power storage device reaches the upper limit voltage during external charging, external charging control is finished, thereby preventing voltage of the power storage device from excessively increasing.

During external charging, a voltage of the power storage device is higher than that of electromotive force of the power storage device by a voltage equivalent to the product of charging current and internal resistance of the power storage device. Focusing on this point, it is considered to reduce charging current, at the time when a voltage of the power storage device exceeds a predetermined voltage lower than the upper limit voltage, as compared with that during a period of time where a voltage of the power storage device is less than the predetermined voltage. This causes the product of charging current and internal resistance to be reduced, so that the voltage is less likely to reach the upper limit voltage. Thus, external charging can be continued for a long period as compared with when charging current is not reduced. As a result, the amount of electric power stored in the power storage device can be increased to extend an available distance of EV travel of a vehicle. This kind of control is also referred to as "electric current reduction control" below.

External charging is performed at a user's home or the like in many cases, but may be performed at a charging station away from home (e.g., a public charging station). A typical charging station uses a billing method for billing electricity bills in accordance with charging time. When electric current reduction control is performed in a charging station of a time billing method as described above, charging electric power during performing of the electric current reduction control is less than charging electric power during performing of normal charging control, but the same electricity bills are required. That is, the electricity bills become relatively expensive.

In a public charging station, when the number of vehicles requiring external charging is more than the number of installed charging stations, some users are caused to wait for their turn for external charging. When electric current reduction control is performed in such a circumstance, time until external charging is completed increases as compared with when electric current reduction control is not performed, and thus a queue for waiting for a turn is less likely to be eliminated. As a result, user's convenience may be deteriorated.

The present disclosure provides a vehicle configured to be capable of charging a power storage device with electric power supplied from a charging apparatus installed outside the vehicle and a method for charging the vehicle, wherein the vehicle and the method for charging the vehicle are capable of improving ease of use of a charging station while an available distance of EV travel is tried to be extended.

A first aspect of the present disclosure is a vehicle. The vehicle includes a power storage device, a power-receiving unit, and an electronic control unit. The power-receiving unit is configured to receive electric power from an external charging apparatus to charge the power storage device. The external charging apparatus is installed outside the vehicle. The electronic control unit is configured to perform electric current reduction control. The electric current reduction control is a control in which charging current into the power storage device from the external charging apparatus is reduced when a voltage of the power storage device is higher than a predetermined voltage, as compared with the charging current when a voltage of the power storage device is lower than the predetermined voltage. The electronic control unit is configured to charge the power storage device with electric power supplied from the external charging apparatus by the electric current reduction control such that charging time when the external charging apparatus is a billing charging apparatus is shorter than charging time when the external charging apparatus is other than the billing charging apparatus. The billing charging apparatus is configured to bill electricity bills in accordance with charging time.

In the vehicle, the electronic control unit may be configured to perform the electric current reduction control when the external charging apparatus is other than the billing charging apparatus. The electronic control unit may be configured not to perform the electric current reduction control when the external charging apparatus is the billing charging apparatus.

With this configuration, charging time by the electric current reduction control is reduced when the external charging apparatus is a billing charging apparatus (e.g., when external charging is performed at a public charging station), as compared with when the external charging apparatus is not the billing charging apparatus (e.g., when external charging is performed at a user's home). This enables available distance of EV travel of the vehicle to be extended by storing the amount of electric power as much as possible in the power storage device by the electric current reduction control, when the external charging apparatus is not the billing charging apparatus. Meanwhile, when the external charging apparatus is the billing charging apparatus, reduction in charging time by the electric current reduction control enables electricity bills to be appropriately saved and a queue for waiting for a turn to be eliminated, whereby ease of use of a billing charging apparatus can be improved.

The vehicle may further include an operation unit. The operation unit may be configured to receive a user operation that includes a performance command of the electric current reduction control. The electronic control unit may be configured to reduce charging time by the electric current reduction control when the external charging apparatus is the billing charging apparatus and the operation unit receives the user operation.

With this configuration, a user can determine whether to reduce charging time by the electric current reduction control, according to a situation. For example, saving of electricity bills is prior to extension of an available distance of EV travel at normal time, so that charging time by the electric current reduction control can be reduced. Alternatively, even when there is another vehicle waiting for charging at an external charging apparatus (charging station), charging time by the electric current reduction control can be reduced in consideration of convenience of a user of the vehicle. Meanwhile, when there is a plan to travel for a long distance, for example, extension of an available distance of EV travel is prior to saving of electricity bills, and thus performance of electric current reduction control can be selected even when external charging is performed at a billing charging apparatus of a time billing method.

The vehicle may further include a location information acquiring device. The location information acquiring device may be configured to acquire location information indicating a current location of the vehicle. The electronic control unit may be configured to determine that the external charging apparatus is other than the billing charging apparatus when the current location is a registered location that is registered in advance. The electronic control unit may be configured to determine that the external charging apparatus is the billing charging apparatus when the current location is other than the registered location.

With this configuration, it is determined whether the external charging apparatus is the billing charging apparatus by using location information on the vehicle. It is determined whether the external charging apparatus is the billing charging apparatus by using location information as described above, so that convenience of a user can be improved by eliminating user's effort to determine whether the electric current reduction control is performed.

A second aspect of the present disclosure is a method for charging a vehicle. The vehicle includes a power storage device and an electronic control unit. The power storage device is configured to be charged with electric power supplied from an external charging apparatus. The method includes: performing, by the electronic control unit, electric current reduction control; determining, by the electronic control unit, whether the external charging apparatus is a billing charging apparatus that is configured to bill electricity bills in accordance with charging time; and reducing, by the electronic control unit, charging time by the electric current reduction control when the external charging apparatus is the billing charging apparatus to less than charging time by the electric current reduction control when the external charging apparatus is other than the billing charging apparatus. The electric current reduction control is a control in which charging current into the power storage device from the external charging apparatus is reduced when a voltage of the power storage device is higher than a predetermined voltage, as compared with the charging current when a voltage of the power storage device is lower than the predetermined voltage.

With the configuration described above, a vehicle configured to be capable of charging a power storage device with electric power supplied from a charging apparatus installed outside the vehicle and a method for charging the vehicle enable improvement in ease of use of a charging station while an available distance of EV travel is tried to be extended.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
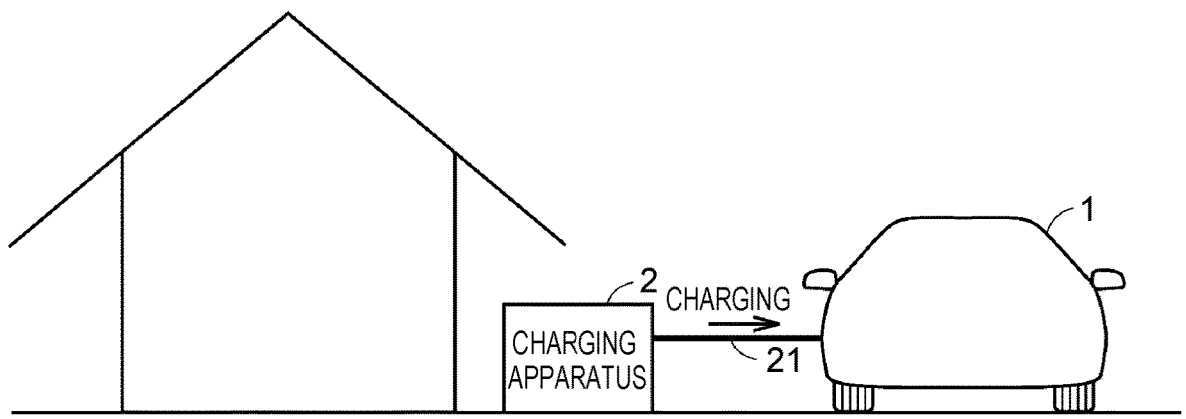
FIG. 1 schematically illustrates a general configuration of a charging system including a vehicle according to the present embodiment.
Figure 1:
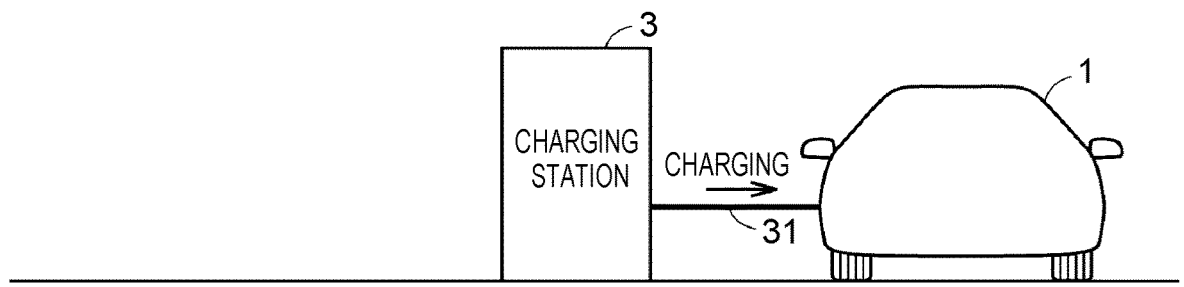

With reference to accompanying drawings, an embodiment of the present disclosure will be described in detail below. The same or equivalent portion in the drawings is designated by the same reference numeral to eliminate duplicated description.

Embodiment

FIG. 1 schematically illustrates a general configuration of a charging system including a vehicle according to the present embodiment. The vehicle 1 includes an external charging function. The vehicle 1 is a plug-in hybrid vehicle in the present embodiment, but may be an electric vehicle. External charging of the vehicle 1 can be broadly performed under two-way conditions described below.

First, external charging of the vehicle 1 can be performed at a user's home or the like by a charging apparatus 2 that is configured to bill electricity bills in accordance with the amount of charged electric power. In this case, the vehicle 1 is connected to the charging apparatus 2 through a charge cable 21 as illustrated in an illustration of external charging at a home of FIG. 1. While external charging at a user's home is described in the present embodiment, for example, an installation location of the charging apparatus 2 is not particularly limited.

Second, external charging of the vehicle 1 may be performed at a charging station 3 installed away from a user's home, for example. In this case, the vehicle 1 is connected to the charging station 3 through a charge cable 31 as illustrated in an illustration of external charging at a charging station of FIG. 1. The typical charging station 3 uses a billing method (time billing method) for billing electricity bills in accordance with charging time.

Figure 2:
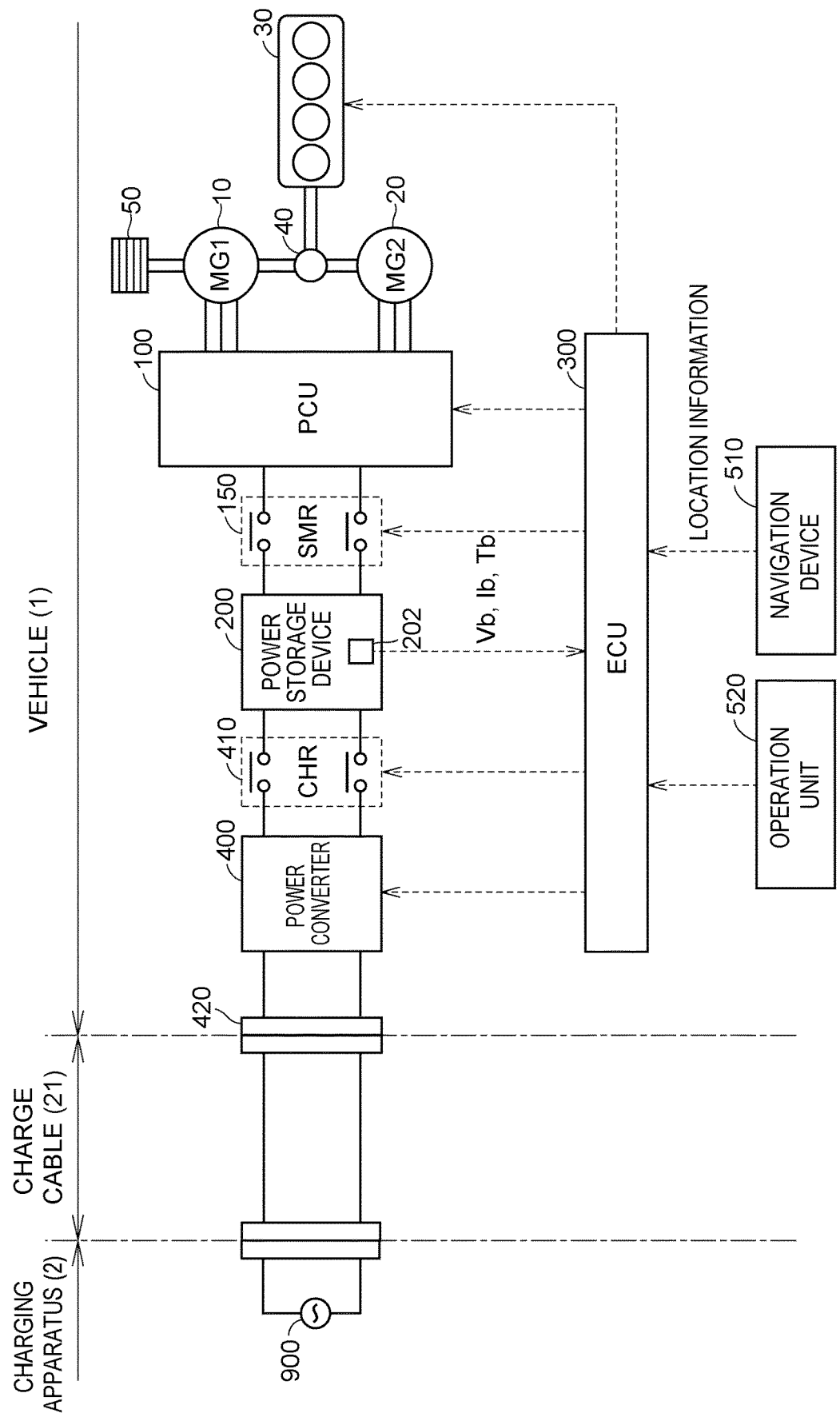
FIG. 2 is a block diagram schematically illustrating a configuration of a vehicle.

Each of the charging apparatus 2 and the charging station 3 is installed outside the vehicle 1, and supplies electric power to the vehicle 1 from a system power source 900 (e.g., a commercial power supply, refer to FIG. 2). Each of the charging apparatus 2 and the charging station 3 is an example of an "external charging apparatus" according to the present disclosure.

In the present embodiment, there is described a configuration of "contact charging" in which a power converter 400 (refer to FIG. 2) mounted in the vehicle 1 and the charging apparatus 2 or the charging station 3 are electrically connected to each other through the corresponding one of the charge cables 21, 31, for example. However, external charging control in the present embodiment can be applied to a configuration of "non-contact charging" in which electric power is transmitted to a power-receiving apparatus (not illustrated, and one example of a "power-receiving unit" according to the present disclosure) mounted in a vehicle from transmission equipment (not illustrated) buried in the ground in a non-contact manner.

FIG. 2 is a block diagram schematically illustrating a configuration of the vehicle 1. The vehicle 1 includes a motor generator 10 (indicated as an MG1), a motor generator 20 (indicated as an MG2), an engine 30, a power split device 40, a driving wheel 50, power control unit (PCU) 100, a system main relay (SMR) 150, a power storage device 200, electronic control unit (ECU) 300, a navigation device 510, and an operation unit 520.

The motor generators 10, 20 each are a three-phase AC rotary electric machine in which a permanent magnet is embedded in a rotor (not illustrated), for example. The motor generator 10 is coupled to a crankshaft of the engine 30 through the power split device 40. The motor generator 10 rotates the crankshaft of the engine 30 by using electric power of the power storage device 200 when the engine 30 is started. The motor generator 10 also can generate electric power by using power of the engine 30. AC power generated by the motor generator 10 is converted into DC power by the PCU 100 to be stored in the power storage device 200. The AC power generated by the motor generator 10 may be sometimes supplied to the motor generator 20.

The motor generator 20 rotates a drive shaft by using at least one of electric power from the power storage device 200 and electric power generated by the motor generator 10. The motor generator 20 also can generate power by using regenerative braking. AC power generated by the motor generator 20 is converted into DC power by the PCU 100 to be stored in the power storage device 200.

The engine 30 is an internal combustion engine, such as a gasoline engine and a diesel engine, and generates power required to allow the vehicle 1 to travel in response to a control signal from the ECU 300. The power split device 40 is a planetary gear train, for example, and splits power generated by the engine 30 into power to be transmitted to the driving wheel 50 and power to be transmitted to the motor generator 10.

The PCU 100 coverts DC power stored in the power storage device 200 into AC power in response to a control signal from the ECU 300, and supplies the AC power to the motor generators 10, 20. The PCU 100 also converts AC power generated by the motor generators 10, 20 into DC power, and supplies the DC power to the power storage device 200.

The SMR 150 is electrically connected to an electric power line connecting the PCU 100 and the power storage device 200. The SMR 150 switches between supply and interruption of electric power between the PCU 100 and the power storage device 200 in response to a control signal from the ECU 300.

The power storage device 200 is a DC power supply configured to enable charging and discharging. As the power storage device 200, a secondary battery such as a lithium ion battery and a nickel hydrogen battery, as well as a capacitor such as an electric double layer capacitor, is available. The power storage device 200 supplies electric power to generate driving force of the vehicle 1 to the PCU 100. The power storage device 200 also stores electric power generated by the motor generator 10.

The power storage device 200 is provided with a monitor unit 202. The monitor unit 202 includes a voltage sensor, a current sensor, and a temperature sensor (each of them is not illustrated). The voltage sensor detects a voltage Vb of the power storage device 200. The current sensor detects a current Ib that is input into and output from the power storage device 200. The temperature sensor detects a temperature Tb of the power storage device 200. Each of the sensors outputs a signal indicating its detection result to the ECU 300. The ECU 300 estimates a state of charge (SOC) of the power storage device 200 on the basis of the voltage Vb, the electric current Ib, and the temperature Tb. A publicly known method can be used for a method for estimating the SOC, so that detailed description thereof is not duplicated.

The vehicle 1 further includes a power converter 400, a charging relay (indicated as a CHR) 410, and an inlet 420, as a configuration to achieve an external charging function. FIG. 1 shows a state where the charging apparatus 2 and the power converter 400 are electrically connected to each other through the charge cable 21 and inlet 420 when external charging of the vehicle 1 is performed at a user's home. The inlet 420 is an example of a "power-receiving unit" according to the present disclosure.

The power converter 400 includes an AC-DC converter (not illustrated), for example, and converts AC power supplied from the charging apparatus 2 into DC power to charge the power storage device 200.

The charging relay 410 is electrically connected to an electric power line connecting the power storage device 200 and the power converter 400. The charging relay 410 switches between supply and interruption of electric power between the power storage device 200 and the power converter 400 in response to a control signal from the ECU 300.

The ECU 300 includes a central processing unit (CPU), a memory, and a buffer (each of them is not illustrated). The ECU 300 outputs a control signal on the basis of input of a signal from each of the sensors, and a map and a program stored in the memory, and also controls each apparatus such that the vehicle 1 becomes desired conditions. While primary control performed by the ECU 300 includes external charging control of the vehicle 1, this control will be described below.

The navigation device (an example of a location information acquiring unit) 510 includes a global positioning system (GPS) receiver to acquire location information indicating a current location of the vehicle 1, and outputs the acquired location information to the ECU 300. The navigation device 510 is configured to enable providing a route guidance function of guiding a recommended route from a current location of the vehicle 1 to a destination, suitable for the destination set by a user. In addition, the navigation device 510 is configured to enable registration of location information on a user's home for a case where the user's home is set as a destination when a user returns home from a place away from home.

The operation unit 520 is an operation button or an operation switch, for example, and receives a user operation (such as a charging start operation described below and a user operation indicating a performance command of second charging control) associated with external charging. The operation unit 520 outputs a signal indicating received operation contents to the ECU 300.

In the vehicle 1 configured as described above, it is desirable to increase the amount of electric power to be stored in the power storage device 200 as much as possible at the time of external charging to secure a sufficient available distance of EV travel (a distance over which the vehicle 1 can travel until electric power stored in the power storage device 200 is consumed to a predetermined value while the engine 30 is basically stopped). Meanwhile, an upper limit voltage UL is set for the power storage device 200 to protect the power storage device 200. To achieve both of a sufficient available distance of EV travel and protection of the power storage device 200, the ECU 300 is configured to be able to control the power converter 400 such that charging current to the power storage device 200 decreases when the voltage Vb of the power storage device 200 is a predetermined voltage Vp (Vp<UL) or more, as compared with when the voltage Vb of the power storage device 200 is less than the predetermined voltage Vp.

Figure 3:
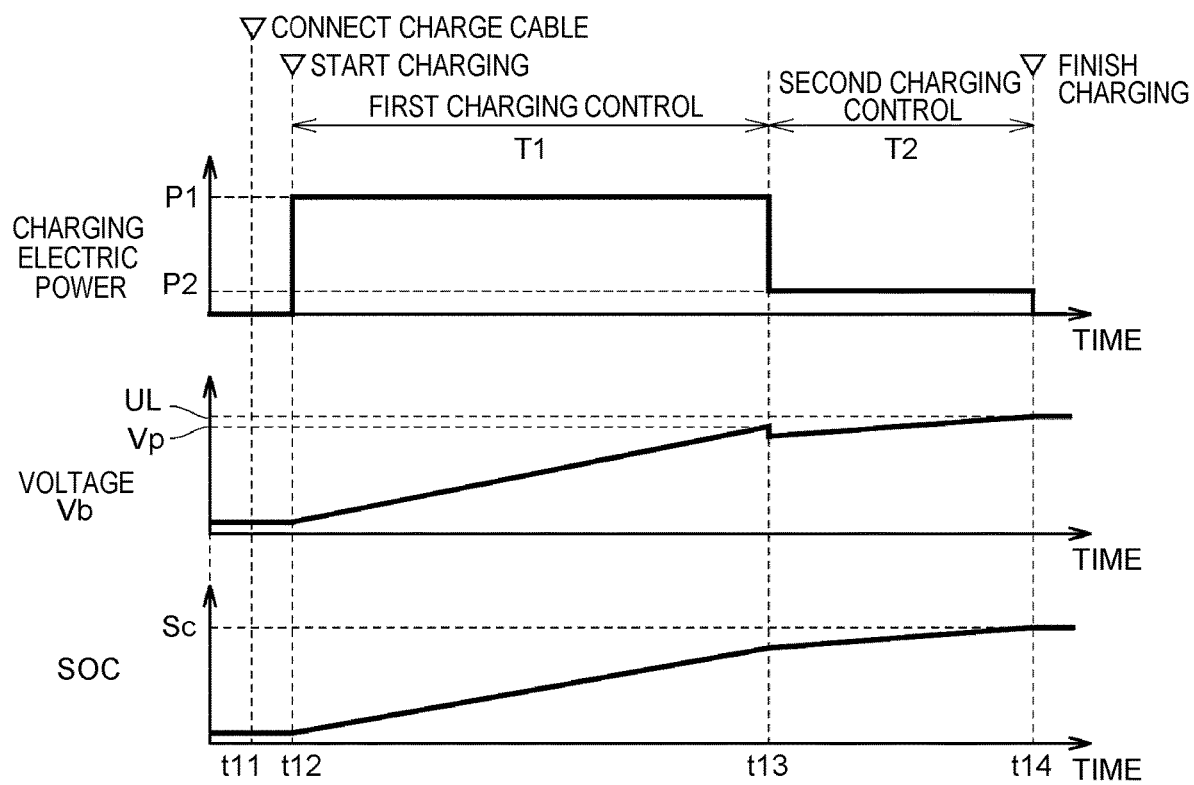
FIG. 3 is a time chart illustrating an example of external charging control of a vehicle at a charging apparatus.

FIG. 3 is a time chart illustrating an example of external charging control (refer to an illustration of external charging at home of FIG. 1) of a vehicle 1 at a charging apparatus 2 (e.g., at a user's home). In each of FIG. 3, and FIGS. 4, 6, and 8 described below, the horizontal axis indicates elapsed time. Then, the vertical axis indicates charging electric power to the power storage device 200, voltage Vb of the power storage device 200, and SOC of the power storage device 200, in order from above downward.

At time t11, the charge cable 21 is connected to the inlet 420 of the vehicle 1. When a user further performs a predetermined charging start operation, "first charging control" is started at time t12. In the first charging control, charging is performed with steady electric power P1, for example. As time elapses, the voltage Vb of the power storage device 200 increases, and the SOC of the power storage device 200 also increases. However, charging with steady electric power is not always required in the first charging control, and thus charging electric power may vary as time elapses.

When the voltage Vb of the power storage device 200 reaches the predetermined voltage Vp at time t13, external charging control of the vehicle 1 is switched from the first charging control to "second charging control". In the second charging control, charging current is set less than that in the first charging control. In the present embodiment, charging electric power to the power storage device 200 is reduced to P2 being about one-fourth of P1 from P1 (P1=4×P2). As a result, while the voltage Vb temporarily decreases, the voltage Vb increases as time elapses after that to increase the SOC of the power storage device 200.

At time t14, the voltage Vb of the power storage device 200 reaches the upper limit voltage UL. Then, it is determined that charging of the power storage device 200 is completed, so that the external charging control is finished.

As described above, when external charging of the vehicle 1 is performed at the charging apparatus 2 (user's home), external charging control of the vehicle 1 is switched from the first charging control to the second charging control. The voltage Vb of the power storage device 200 during external charging increases more than that of electromotive force E of the power storage device 200 (Vb=E+Ib×R) by a voltage (Ib×R) equivalent to the product of charging current Ib to the power storage device 200 and internal resistance R of the power storage device. Thus, as the charging current Ib decreases, the voltage Vb is less likely to reach the upper limit voltage UL. Performing the second charging control enables increase in the amount of electric power stored in the power storage device 200 until the voltage Vb reaches the upper limit voltage UL, so that an available distance of EV travel can be extended. The second charging control is an example of "electric current reduction control" according to the present disclosure.

While FIG. 3 illustrates an example of external charging control at a user's home, it is thought that external charging control like that at home is performed even when external charging is performed at the charging station 3 away from the user's home (refer to an illustration of external charging at a charging station of FIG. 1). In comparison between the first charging control and the second charging control, while there is a difference (a four times difference in the example of FIG. 3) in charging electric power (the amount of charged electric power per unit time), electricity bills per unit time during performing of the first charging control is equal to electricity bills per unit time during performing of the second charging control in the charging station 3 of a time billing method. That is, the electricity bills become relatively expensive by performing the second charging control.

In the public charging station 3, when the number of vehicles requiring external charging is more than the number of installed charging stations 3, some users are caused to wait for their turn for external charging. When the second charging control is performed subsequently to the first charging control in such a circumstance, time until external charging is completed increases as compared with when the second charging control is not performed, and thus a queue for waiting for a turn is less likely to be eliminated. As a result, user's convenience may be deteriorated.

The present embodiment uses a configuration in which while the second charging control is performed subsequently to the first charging control when an external charging apparatus is the charging apparatus 2 (e.g., when external charging is performed at home), only the first charging control is performed without performing the second charging control when an external charging apparatus is the charging station 3 (e.g., when external charging is performed at a place other than home). A configuration of a charging system when external charging of the vehicle 1 is performed at the charging station 3 (place other than home) is basically identical to the configuration illustrated in FIG. 2 except that the charging station 3 and the charge cable 31 are used instead of the charging apparatus 2 and the charge cable 21, and thus description thereof is not duplicated.

Figure 4:
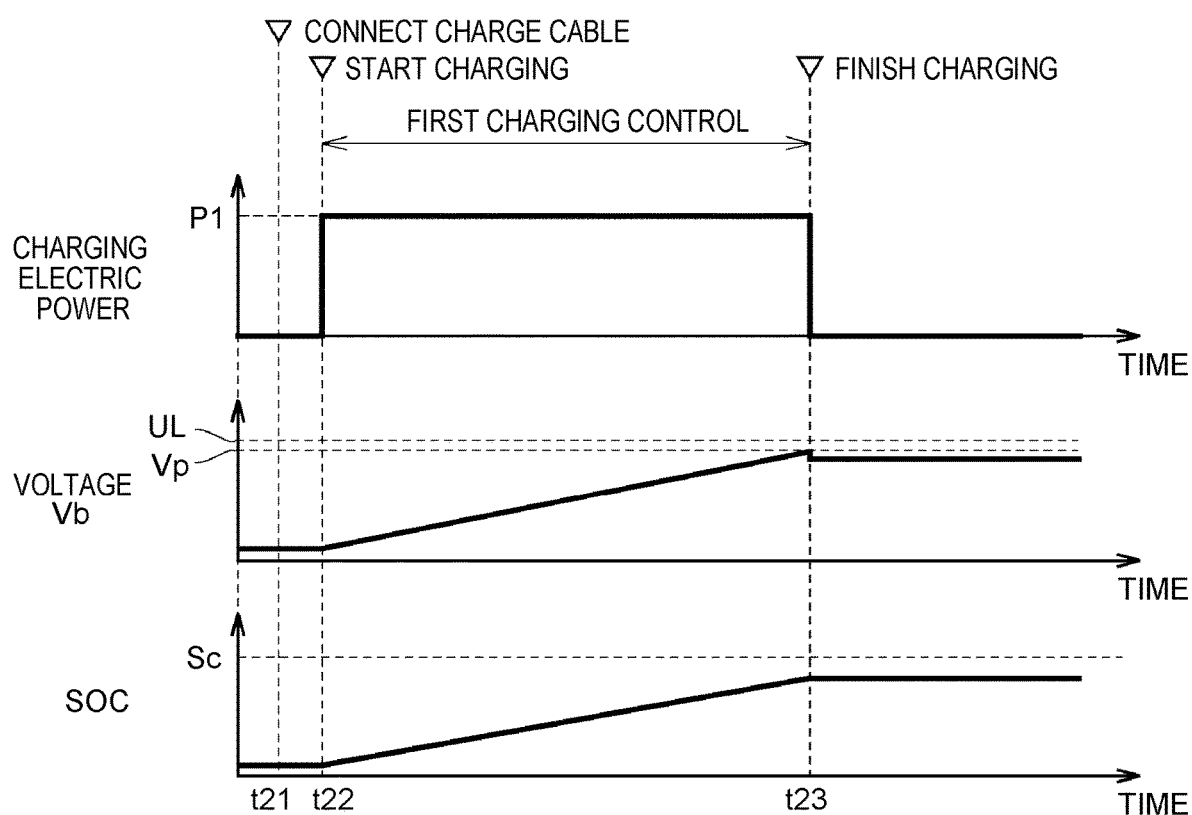
FIG. 4 is a time chart illustrating an example of external charging control of a vehicle at a charging station of a time billing method in the present embodiment.

FIG. 4 is a time chart illustrating an example of external charging control of the vehicle 1 at the charging station 3 in the present embodiment. When a charging start operation is performed by a user while the charge cable 31 is connected to the inlet 420 of the vehicle 1, the first charging control is started at time t22. In the first charging control, charging with steady electric power P1 is performed like that in the external charging control at the charging apparatus 2 (refer to FIG. 3).

After that, when the voltage Vb of the power storage device 200 reaches the predetermined voltage Vp at time t23, the first charging control is stopped. In the present embodiment, the second charging control subsequent to the first charging control is not performed, and then the external charging control is finished.

This enables electricity bills by external charging at the charging station 3 of a time billing method to be appropriately saved. In addition, the second charging control is not performed, so that time until the external charging is completed decreases. Thus, when a queue for waiting for a turn is caused at the charging station 3, the queue is eliminated earlier to enable improvement in convenience of a user waiting for its turn.

Figure 5:
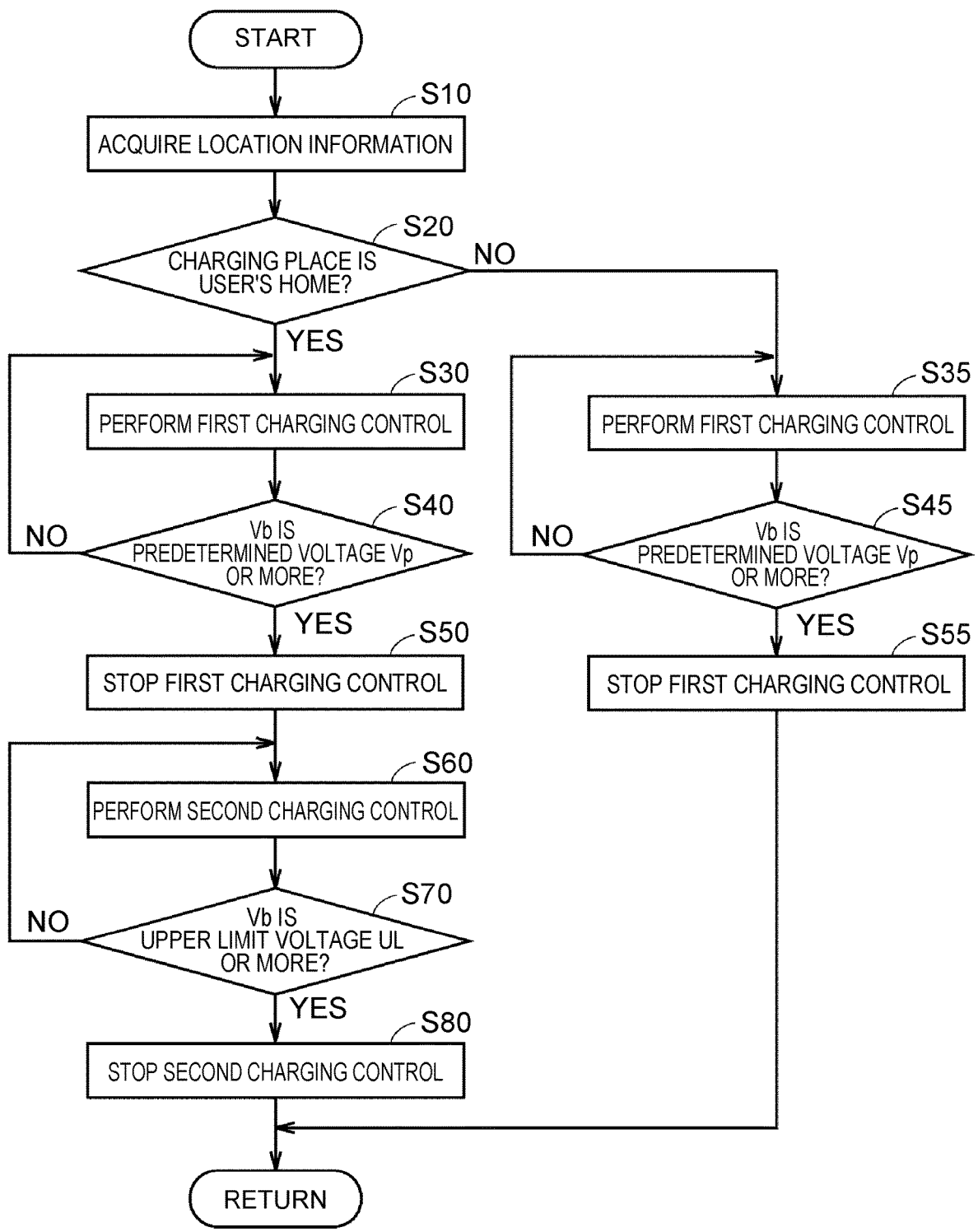
FIG. 5 is a flowchart to describe external charging control in the present embodiment.

FIG. 5 is a flowchart to describe external charging control in the present embodiment. A flowchart illustrated in each of FIG. 5, and FIGS. 7, 9, and 10 described below, is invoked from a main routine and is performed when predetermined conditions hold (e.g., when the charge cable 21 or the charge cable 31 is connected to the inlet 420) (refer to time t11 of FIG. 3 or time t21 of FIG. 4). While each step (hereinafter abbreviated as S) is basically performed through software processing by the ECU 300, each step may be performed through hardware processing by an electronic circuit formed in the ECU 300.

At S10, the ECU 300 acquires location information on the vehicle 1 from the navigation device 510.

At S20, the ECU 300 determines whether a current location of the vehicle 1 indicates a user's home on the basis of the location information acquired at S10. Location information on the user's home is registered in advance in the navigation device 510 by the user oneself, for example. The navigation device 510 may be configured to enable registration of two or more kinds of location information (e.g., location information on home, and location information on a relative's house or a friend's house, where a charging apparatus is installed). In this case, the ECU 300 determines whether a current location of the vehicle 1 corresponds to at least one of the two or more kinds of location information, or does not correspond to any of them.

When the location information on the vehicle 1 indicates that a current location of the vehicle 1 is the user's home (YES at S20), the ECU 300 causes processing to proceed to S30. In this case, the ECU 300 determines that an external charging apparatus is not the charging station 3 (billing charging apparatus) of a time billing method, and starts the first charging control (refer to time t12 of FIG. 3). At S40, the ECU 300 determines whether the voltage Vb of the power storage device 200 is the predetermined voltage Vp or more. When the voltage Vb is less than the predetermined voltage Vp (NO at S40), the ECU 300 causes the processing to return to S30, and continues the first charging control. When the voltage Vb increases to the predetermined voltage Vp or more (YES at S40), the ECU 300 causes the processing to proceed to S50, and stops the first charging control (refer to time t13 of FIG. 3).

Subsequently, the ECU 300 starts the second charging control (S60). Then, the ECU 300 determines whether the voltage Vb of the power storage device 200 is the upper limit voltage UL or more (S70). When the voltage Vb is less than the upper limit voltage UL (NO at S70), the ECU 300 causes the processing to return to S60, and continues the second charging control. When the voltage Vb increases to the upper limit voltage UL or more (YES at S70), the ECU 300 causes the processing to proceed to S80, and stops the second charging control (refer to time t14 of FIG. 3). After that, the processing is returned to the main routine.

In contrast, when the location information on the vehicle 1 indicates that a current location of the vehicle 1 is not the user's home at S20 (NO at S20), the ECU 300 determines that the vehicle 1 is charged at a public charging station 3 of a time billing method (or may be charged thereat) to cause the processing to proceed to S35, and starts the first charging control (refer to time t22 of FIG. 4).

Processing at S45 and that at S55 are identical to the processing at S40 and that at S50, respectively. That is, the ECU 300 determines whether the voltage Vb of the power storage device 200 is the predetermined voltage Vp or more. When the voltage Vb is less than the predetermined voltage Vp (NO at S45), the ECU 300 continues the first charging control (S35). When the voltage Vb increases to the predetermined voltage Vp or more (YES at S45), the ECU 300 stops the first charging control (S55, refer to time t23 of FIG. 4). However, the ECU 300 causes the processing to return to the main routine without performing the second charging control subsequently to the first charging control.

As described above, according to the present embodiment, when external charging is performed at the charging apparatus 2 installed at a user's home, the second charging control is performed subsequently to the first charging control. This enables the power storage device 200 to store the amount of electric power as much as possible to extend an available distance of EV travel of the vehicle 1. Meanwhile, when external charging is performed at a charging station 3 away from home, performing of the second charging control is reduced. This enables electricity bills to be appropriately saved when the charging station 3 is a time billing method. In addition, the second charging control is not performed, so that time until the external charging is completed decreases. Thus, when a queue for waiting for a turn is caused at the charging station 3, the queue is eliminated earlier to enable improvement in convenience of a user waiting for its turn. As described above, ease of use of a charging station 3 can be improved while an available distance of EV travel is tried to be extended when external charging is performed at a user's home.

In FIG. 5, there is described a configuration in which when each of the charge cables 21, 31 is connected to the inlet 420, location information on the vehicle 1 is immediately acquired to determine whether a current location of the vehicle 1 is a user's home, for example (refer to S10 and S20). These kinds of processing may be performed while the first charging control is performed, or may be performed immediately after the first charging control is stopped.

In FIGS. 3 to 5 each, there is described an example in which the voltage Vb of the power storage device 200 is monitored to control a start and stop of the first charging control, and a start and stop of the second charging control, however, a parameter to be monitored is not limited to the voltage Vb. There is a correlation between the voltage Vb and SOC of the power storage device 200, so that external charging control may be performed on the basis of the SOC instead of the voltage Vb.

In the present embodiment, there is also described a configuration in which the power converter 400 mounted in the vehicle 1 controls charging current, however, a configuration (not illustrated) in which a power converter is provided on a charging station 3 side may be available. In this case, when the ECU 300 outputs a command value of charging current to the charging station 3 through the charge cable 31, the first and second charging control are performed.

In the present embodiment, there is described an example in which it is determined whether external charging is performed at a charging apparatus 2 or a charging station 3 on the basis of location information on the vehicle 1. However, information on whether an external charging apparatus is a time billing method or a billing method in accordance with the amount of charged electric power may be transferred through communication between the ECU 300, and the charging apparatus 2 or the charging station 3. While performing the second charging control subsequently to the first charging control when a billing method is a billing method in accordance with the amount of charged electric power, the ECU 300 reduces performing of second charging control when the billing method is a time billing method.

Modification 1

In the embodiment above, there is described a configuration in which the first charging control is performed until the voltage Vb of the power storage device 200 reaches the predetermined voltage Vp regardless of whether external charging of the vehicle 1 is performed at a user's home or a place other than the user's home, for example. However, when external charging of the vehicle 1 is performed at a charging station 3 of a time billing method (other than the user's home), the second charging control subsequent to the first charging control is not performed, and thus the first charging control may be continued for a longer period accordingly.

Figure 6:
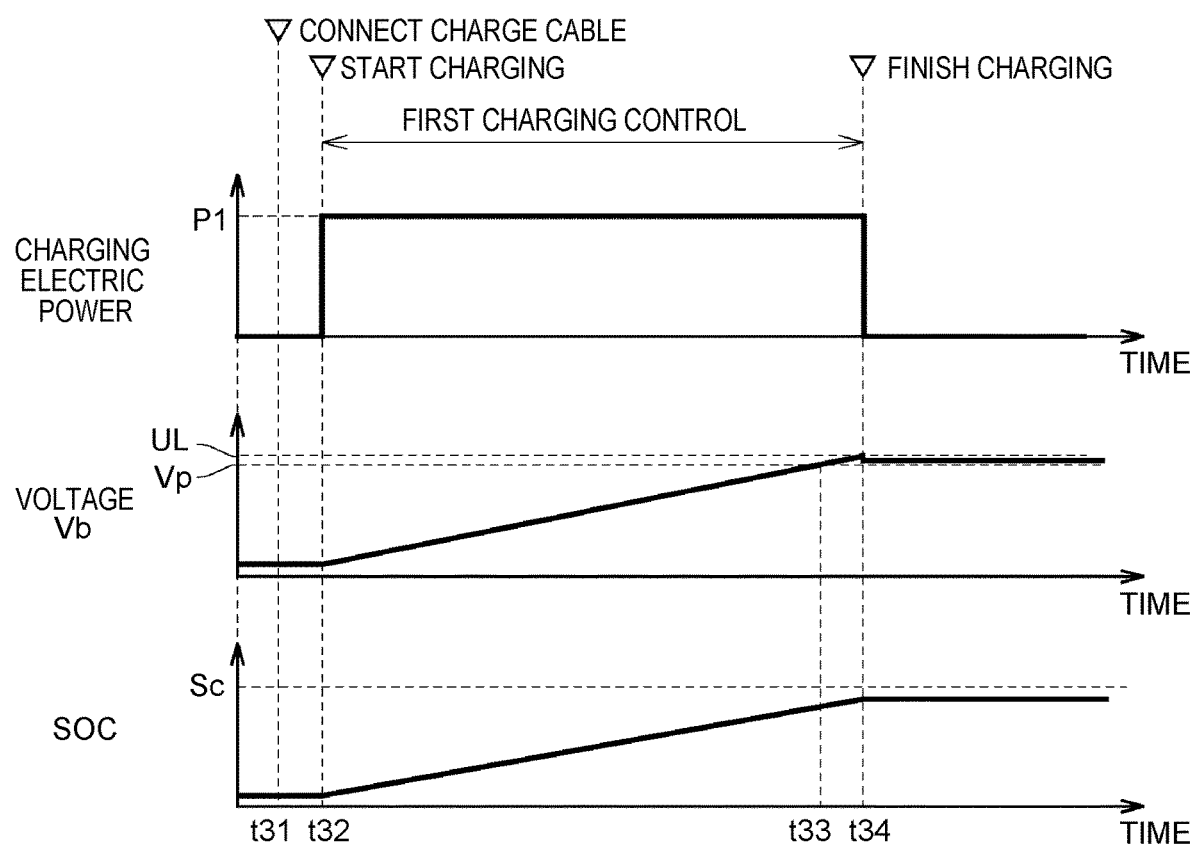
FIG. 6 is a time chart illustrating an example of external charging control of a vehicle at a charging station of a time billing method in a modification 1.

FIG. 6 is a time chart illustrating an example of external charging control of the vehicle 1 at a charging station 3 of a time billing method in a modification 1. When the first charging control is started at time t32, the voltage Vb of the power storage device 200 increases as time elapses, and reaches the predetermined voltage Vp at time t33. Then, however, the first charging control is not stopped in the modification 1, and is continued until the voltage Vb reaches the upper limit voltage UL. When the voltage Vb reaches the upper limit voltage UL at time t34, the first charging control is stopped to finish the external charging control.

Figure 7:
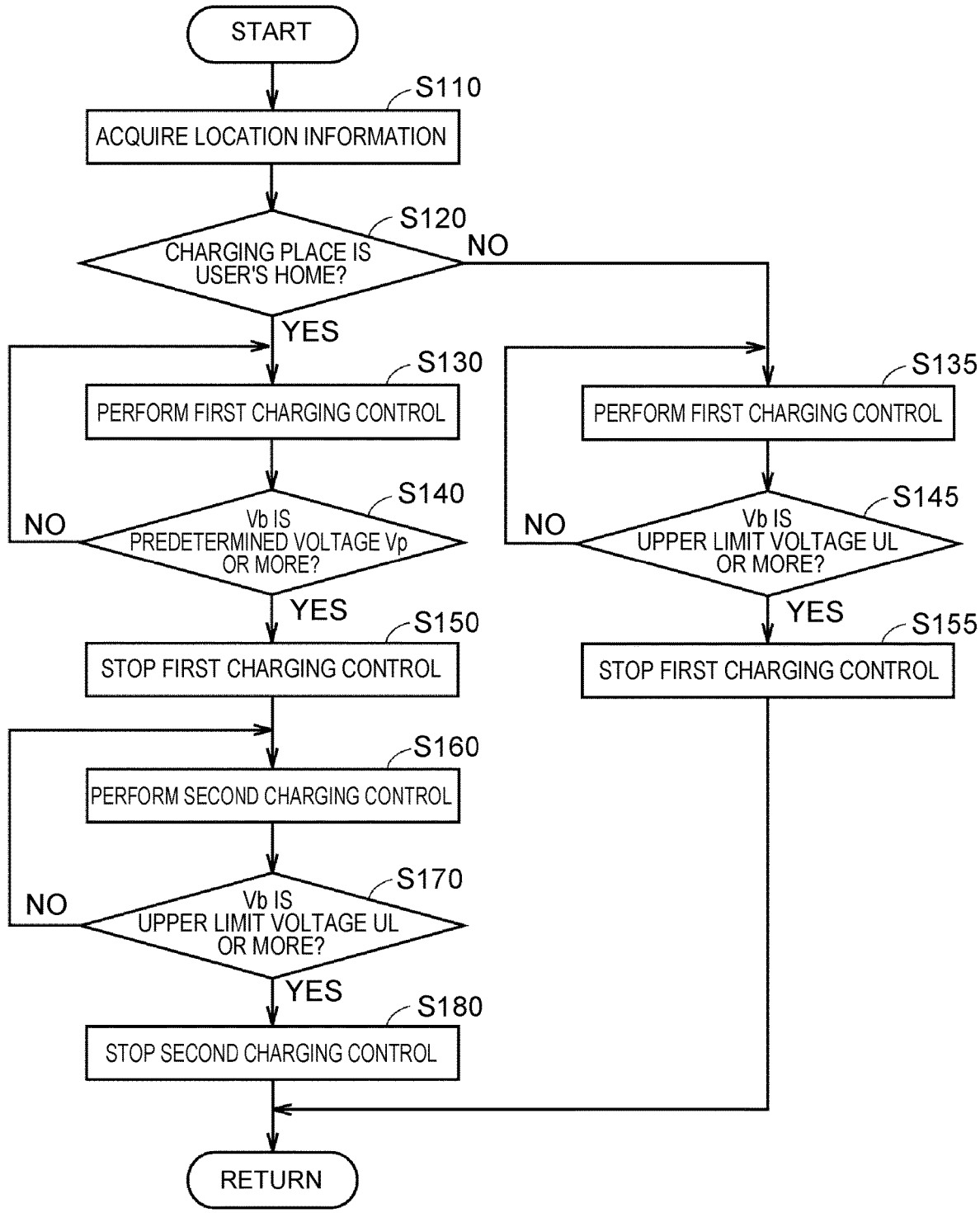
FIG. 7 is a flowchart to describe external charging control in the modification 1.

FIG. 7 is a flowchart to describe external charging control in the modification 1. This flowchart is different from the flowchart in the embodiment above (refer to FIG. 5) in that processing at S145 instead of that at S45 is included. Processing at S110, S120, S130, S140, S150, S160, S170, and S180 in the flowchart illustrated in FIG. 7 is identical to the processing at S10, S20, S30, S40, S50, S60, S70, and S80 in the flowchart of the embodiment above, respectively, so that detailed description thereof is not duplicated.

When location information on the vehicle 1 indicates that a current location of the vehicle 1 is not a user's home at S120 (NO at S120), the ECU 300 starts the first charging control (S135). When the voltage Vb is less than the upper limit voltage UL (NO at S145), the ECU 300 causes processing to return to S135 to continue the first charging control, and when the voltage Vb increases to the upper limit voltage UL or more (YES at S145), the ECU 300 stops the first charging control (S155). After that, the ECU 300 causes the processing to return to a main routine.

According to the modification 1, even when the second charging control is not performed in external charging at a charging station 3 of a time billing method (other than a user's home), the power storage device 200 is charged until the voltage Vb reaches the upper limit voltage UL, as described above. This allows the amount of electric power stored in the power storage device 200 to increase as compared with the embodiment described above, so that an available distance of EV travel can be extended. In the processing at S145, the voltage Vb to stop the first charging control is not always to be the upper limit voltage UL, so that the first charging control may be stopped at the time when the voltage Vb reaches a voltage V that is more than the predetermined voltage Vp and is less than the upper limit voltage UL (Vp<V<UL).

Modification 2

In each of the embodiment above and the modification 1, there is described a configuration in which the second charging control is not performed when external charging of the vehicle 1 is performed at a charging station 3 (other than a user's home). In a modification 2, there is described a configuration in which while the second charging control is performed even when external charging of the vehicle 1 is performed at a charging station 3, charging time by the second charging control decreases as compared with when external charging of the vehicle 1 is performed at a charging apparatus 2 (user's home).

Figure 8:
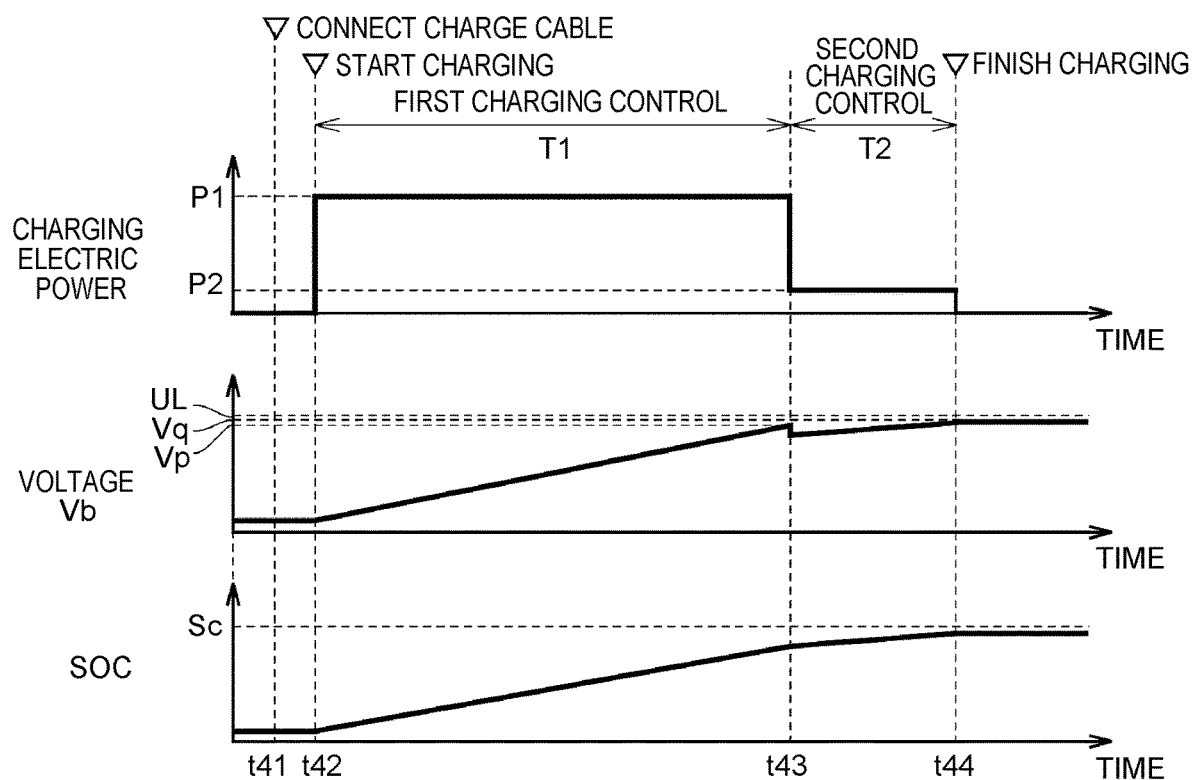
FIG. 8 is a time chart illustrating an example of external charging control of a vehicle at a charging station of a time billing method in a modification 2.

FIG. 8 is a time chart illustrating an example of external charging control of the vehicle 1 at a charging station 3 of a time billing method in the modification 2. The first charging control is started at time t42, and the voltage Vb of the power storage device 200 reaches the predetermined voltage Vp at time 43. Then, the first charging control is stopped, and the second charging control is started. When the voltage Vb reaches a predetermined voltage Vq higher than the predetermined voltage Vp at time t44, the second charging control is stopped to finish the external charging control. The predetermined voltage Vq is higher than the predetermined voltage Vp, but is less than the upper limit voltage UL (Vp<Vq<UL).

Figure 9:
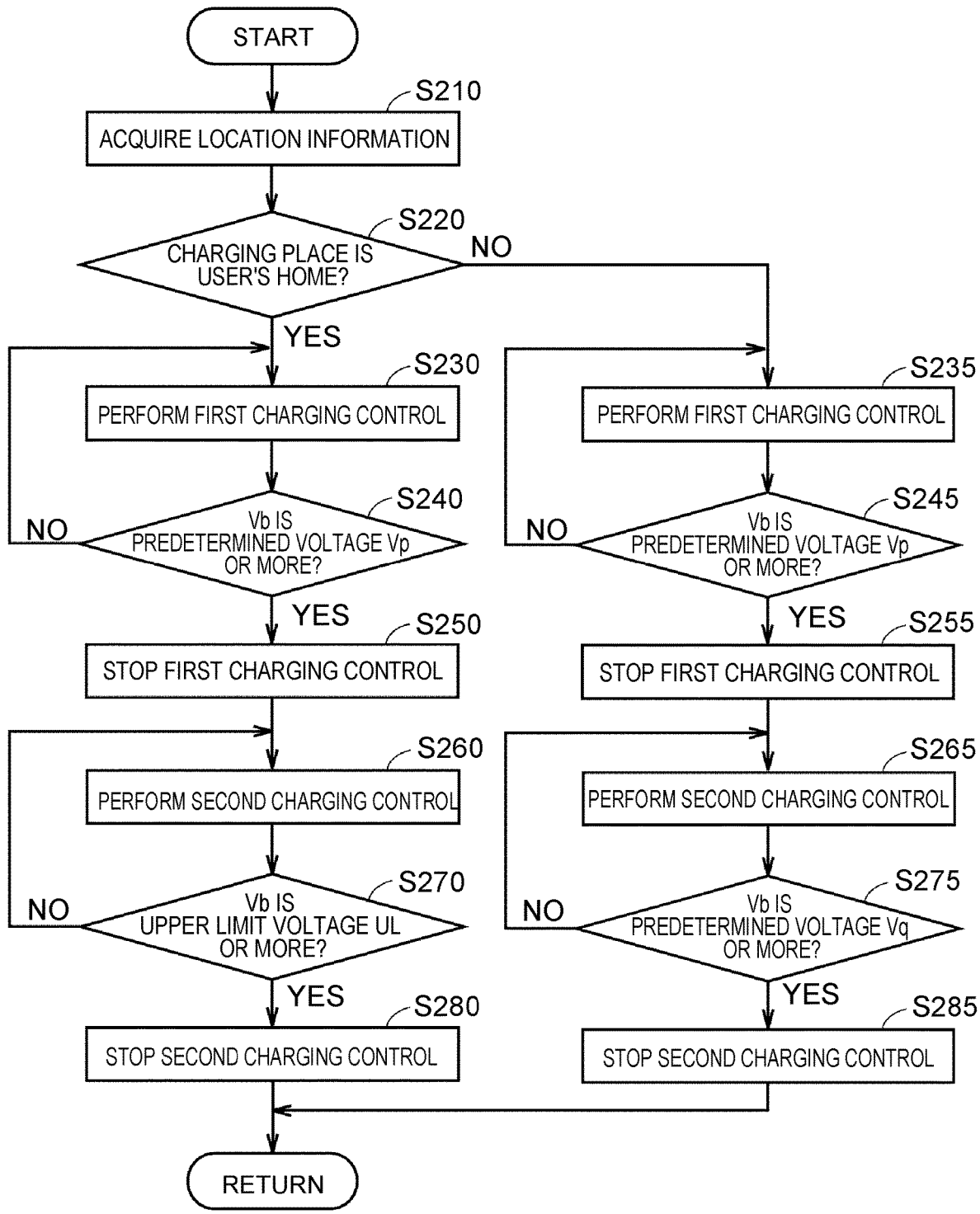
FIG. 9 is a flowchart to describe external charging control in the modification 2.

FIG. 9 is a flowchart to describe external charging control in the modification 2. This flowchart is different from the flowchart in the embodiment above (refer to FIG. 5) in that processing at S265, S275, and S285 is further included. Another processing in the flowchart illustrated in FIG. 9 is identical to the corresponding processing in the flowchart in the embodiment above, so that detailed description thereof is not duplicated.

When the voltage Vb of the power storage device 200 reaches the predetermined voltage Vp at S235 while the first charging control is performed (YES at S245), the ECU 300 stops the first charging control (S255), and starts the second charging control (S265). The second charging control is continued until the voltage Vb reaches the predetermined voltage Vq (Vp<Vq) (NO at S275). When the voltage Vb reaches the predetermined voltage Vq (YES at S275), the ECU 300 stops the second charging control (S285) to cause the processing to return to a main routine.

The predetermined voltage Vq is less than the upper limit voltage UL, so that time required to increase the voltage Vb to the predetermined voltage Vq from the predetermined voltage Vp is shorter than time required to increase the voltage Vb to the upper limit voltage UL from the predetermined voltage Vp. Thus, when external charging of the vehicle 1 is performed at a charging station 3 (other than a user's home), charging time by the second charging control decreases as compared with when external charging of the vehicle 1 is performed at a charging apparatus 2 (user's home) (refer to a period of time T2 of the second charging control in each of FIGS. 3 and 8).

According to the modification 2, while the second charging control is performed even when external charging of the vehicle 1 is performed at a charging station 3, charging time by the second charging control decreases as compared with when external charging of the vehicle 1 is performed at a charging apparatus 2, as described above. Thus, as compared with the embodiment described above, an available distance of EV travel can be extended by increasing the amount of electric power stored in the power storage device 200 in external charging at the charging apparatus 2 while increase in electricity bills when the charging station 3 is a time billing method is reduced as much as possible.

Modification 3

In a modification 3, there is described a configuration in which a user can select whether to perform the second charging control when external charging of the vehicle 1 is performed at a charging station 3.

Figure 10:
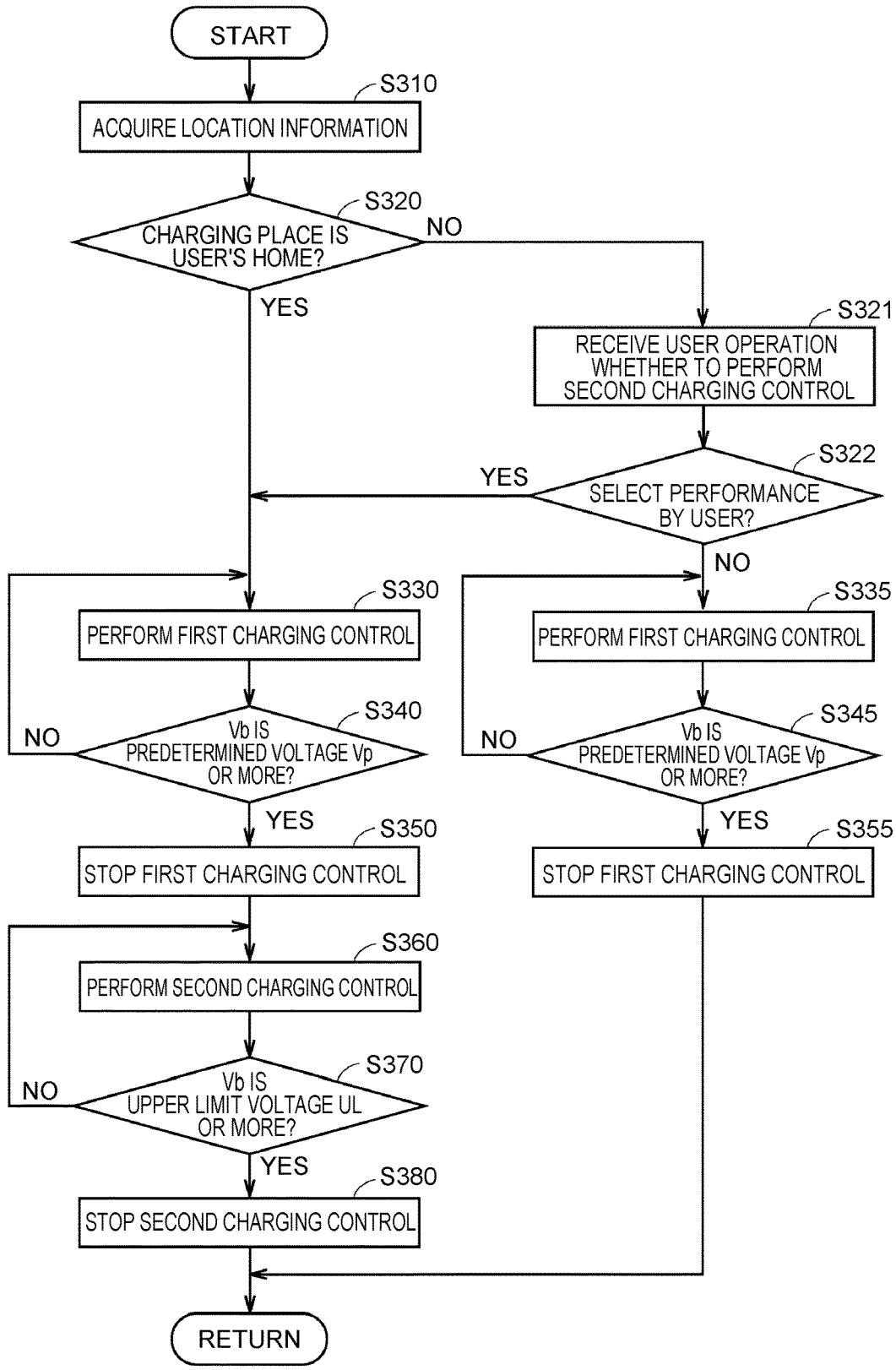
FIG. 10 is a flowchart to describe external charging control in a modification 3.

FIG. 10 is a flowchart to describe external charging control in the modification 3. This flowchart is different from the flowchart in the embodiment above (refer to FIG. 5) in that processing at S321 and S322 is further included. Another processing in the flowchart illustrated in FIG. 10 is identical to the corresponding processing in the flowchart in the embodiment above, so that detailed description thereof is not duplicated.

When location information on the vehicle 1 indicates that a current location of the vehicle 1 is not a user's home (NO at S320), the ECU 300 causes processing to proceed to S321, and receives an operation for allowing a user to select whether to perform the second charging control. Specifically, the ECU 300 causes a screen (not illustrated) of the navigation device 510 to display a message as well as a speaker (not illustrated) to output a voice message to ask a user whether to perform the second charging control. The user operates the operation unit 520 for this inquiry to select whether to perform the second charging control.

When the user selects the second charging control to be performed (YES at S322), the ECU 300 causes the processing to proceed to S330. This causes the second charging control to be performed subsequently to the first charging control, like when a current location of the vehicle 1 is a user's home. Meanwhile, when the user selects not to perform the second charging control (NO at S322), the ECU 300 causes the processing to proceed to S335. In this case, when the voltage Vb of the power storage device 200 reaches the predetermined voltage Vp (YES at S345) to stop the first charging control (S355), the external charging control is finished without performing the second charging control.

According to the modification 3, even when external charging of the vehicle 1 is performed at a charging station 3 (other than a user's home), the second charging control is performed if a user wishes, as described above. This enables a user to select whether to perform the second charging control, according to a situation. For example, when external charging of the vehicle 1 is performed at a charging station 3 of a time billing method, a user can select not to perform the second charging control by basically giving priority to saving of electricity bills over extension of an available distance of EV travel. A user can select not to perform the second charging control to reduce charging time when having insufficient time to a subsequent plan. Alternatively, even when there is another vehicle waiting for charging at a charging station 3, for example, the second charging control can be selected not to be performed in consideration of convenience of a user of the vehicle. Meanwhile, when having a plan to travel for a long distance, such as during travel, a user can select the second charging control to be performed by giving priority to extension of an available distance of EV travel over saving of electricity bills.

In addition, a combination of the modification 3 and the modification 1 as well as a combination of the modification 3 and the modification 2 is available. In the combination of the modification 3 and the modification 1, when external charging of the vehicle 1 is performed at a charging station 3 (other than a user's home) and a user wants the second charging control, the second charging control is performed subsequently to the first charging control. Meanwhile, when the user does not want the second charging control, the first charging control is performed until the voltage Vb reaches the upper limit voltage UL, and the second charging control is not performed.

In the combination of the modification 3 and the modification 2, when external charging of the vehicle 1 is performed at a charging station 3 (other than a user's home) and a user wants the second charging control, the second charging control is performed subsequently to the first charging control, like external charging at a charging apparatus 2 (user's home). Meanwhile, when the user does not want external charging like external charging at a charging apparatus 2 (when reduction in charging time by the second charging control is wanted), the second charging control is stopped at the time when the voltage Vb reaches the predetermined voltage Vq (Vq<UL) after the first charging control is performed.

The embodiment disclosed this time is to be considered to be an example in every point and to be not restrictive. The scope of the present disclosure is shown in the scope of claims instead of the description of the embodiment described above, and is intended to include meaning equivalent to the scope of claims and all modifications in the scope of claims.

What is claimed is:
1. A vehicle comprising:
a power storage device;
a power-receiving unit configured to receive electric power from an external charging apparatus to charge the power storage device, the external charging apparatus being installed outside the vehicle; and
an electronic control unit configured to perform electric current reduction control, the electric current reduction control being a control in which charging current into the power storage device from the external charging apparatus is reduced when a voltage of the power storage device is higher than a predetermined voltage, as compared with the charging current when the voltage of the power storage device is lower than the predetermined voltage, and
the electronic control unit being configured to:
determine whether the external charging apparatus is a billing charging apparatus that is configured to bill electricity bills in accordance with charging time; and
charge the power storage device with electric power supplied from the external charging apparatus by the electric current reduction control such that charging time when the external charging apparatus is determined to be the billing charging apparatus is shorter than charging time when the external charging apparatus is determined not to be the billing charging apparatus.

2. The vehicle according to claim 1, wherein
the electronic control unit is configured to perform the electric current reduction control when the external charging apparatus is determined not to be the billing charging apparatus, and
the electronic control unit is configured not to perform the electric current reduction control when the external charging apparatus is determined to be the billing charging apparatus.

3. The vehicle according to claim 1, further comprising
an operation unit configured to receive a user operation that indicates a performance command of the electric current reduction control,
wherein the electronic control unit is configured to reduce charging time by the electric current reduction control when the external charging apparatus is determined to be the billing charging apparatus and the operation unit receives the user operation.

4. The vehicle according to claim 1, further comprising
a location information acquiring device configured to acquire location information indicating a current location of the vehicle,
wherein the electronic control unit is configured to determine that the external charging apparatus is not the billing charging apparatus when the current location is a registered location that is registered in advance, and
the electronic control unit is configured to determine that the external charging apparatus is the billing charging apparatus when the current location is other than the registered location.

5. A method for charging a vehicle, the vehicle including a power storage device and an electronic control unit, the power storage device being configured to be charged with electric power supplied from an external charging apparatus, the method comprising:
performing, by the electronic control unit, electric current reduction control, the electric current reduction control being a control in which charging current into the power storage device from the external charging apparatus is reduced when a voltage of the power storage device is higher than a predetermined voltage, as compared with the charging current when the voltage of the power storage device is lower than the predetermined voltage;
determining, by the electronic control unit, whether the external charging apparatus is a billing charging apparatus that is configured to bill electricity bills in accordance with charging time; and
reducing, by the electronic control unit, charging time by the electric current reduction control when the external charging apparatus is determined to be the billing charging apparatus to less than charging time by the electric current reduction control when the external charging apparatus is determined not to be the billing charging apparatus.

* * * * *

UNITED STATES PATENT AND TRADEMARK OFFICE
CERTIFICATE OF CORRECTION

| | |
|---|---|
| PATENT NO. | : 10,589,632 B2 |
| APPLICATION NO. | : 15/817869 |
| DATED | : March 17, 2020 |
| INVENTOR(S) | : Kotaro Wada |

Page 1 of 1

It is certified that error appears in the above-identified patent and that said Letters Patent is hereby corrected as shown below:

On the Title Page

Item (72), inventor, city, delete "Nagakute (JP)" and insert --Nagakute-shi Achi-ken (JP)--, therefor.

Signed and Sealed this
Second Day of June, 2020

Andrei Iancu
*Director of the United States Patent and Trademark Office*